United States Patent [19]
Boyer et al.

[11] 3,711,003
[45] Jan. 16, 1973

[54] CAPSTAN DRIVE ARRANGEMNET FOR HIGH-SPEED INTERMITTENT TAPE DRIVE

[75] Inventors: Marcel-Louis Boyer, Chatillon; Michel Landwerlin, Le Pecq, both of France

[73] Assignee: Compagnie Industrielle Des Telecommunications Cit-Alcatel, Paris, France

[22] Filed: Sept. 27, 1971

[21] Appl. No.: 183,752

[52] U.S. Cl. .................................. 226/177, 226/187
[51] Int. Cl. ............................................. B65h 17/22
[58] Field of Search ............... 226/176, 177, 186, 187

[56] References Cited

UNITED STATES PATENTS 3,136,467  6/1964  Olson .................................. 226/177
3,494,612  2/1970  Killam ............................. 226/187 X

*Primary Examiner*—Richard A. Schacher
*Attorney*—Craig, Antonelli and Hill

[57] ABSTRACT

Capstan drive arrangement for high speed intermittent tape drive, including a motor driven capstan, an idler roller carried on a lever arm, and an electromagnet selectively operable to pivot the level about its axis to urge the idler roller towards the capstan to produce a tape driving pinch. The level arm is arranged so that when the electromagnet is not operated, the idler roller contacts the tape with substantially negligible pressure. The drive arrangement also includes a damping system having an elastically deformable connection between the lever arm and a rod having a side surface held in contact with a fixed abutment by a pusher.

20 Claims, 1 Drawing Figure

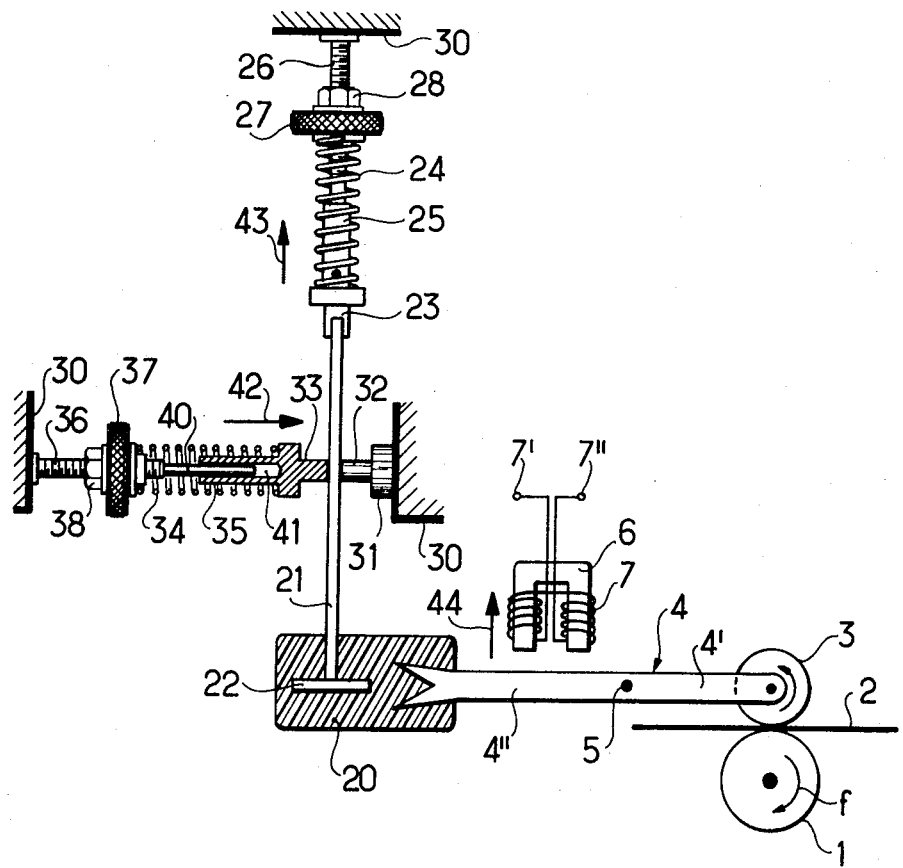

CAPSTAN DRIVE ARRANGEMNET FOR HIGH-SPEED INTERMITTENT TAPE DRIVE

The present invention relates to an improvement and/or a modification of the invention disclosed in copending U.S. Application Ser. No. 148,549, filed on June 1, 1971, and assigned to the same assignee as this application.

The copending application describes a capstan drive arrangement suitable for high speed intermittent tape drive, including a motor driven capstan, an idler roller carried on a lever arm, an electromagnet selectively operable to pivot the lever arm about its axis to urge the idler roller towards the capstan to produce a tape-driving pinch spot, the lever arm being so arranged that when the electromagnet is not operated the idler roller contacts the tape with substantially negligible pressure, the drive arrangement also including a damping system comprising an elastically deformable connection between the lever arm and a tube slidable on a rod, the tube and rod being coupled together by a spring.

The described arrangement produces a damping of the idler wheel by combining the damping of the elastically deformable connection, having a resonant frequency $f_1$, with the frictional damping of a system having a lower resonant frequency $f_2$. The frictional damping is due to the friction between the tube and the rod. This arrangement is mechanically delicate and may require adjustment to compensate for temperature variations.

According to the present invention there is provided a capstan drive arrangement suitable for a high speed intermittent tape drive, including a motor driven capstan, an idler roller carried on a lever arm, an electromagnet selectively operable to pivot the lever arm about its axis to urge the idler roller towards the capstan to produce a tape driving pinch, the lever arm being so arranged that when the electromagnet is not operated, the idler roller contacts the tape with substantially negligible pressure, the drive arrangement also including a damping system having an elastically deformable connection between the lever arm and a rod having a side surface held in contact with a fixed abutment by a pusher.

The present invention will be further described, by way of example only, with reference to the accompanying drawing, in which:

The sole FIGURE is a schematic view, in partial cross-section, of a capstan drive arrangement.

Referring to the FIGURE, a capstan drive arrangement includes a motor-driven capstan 1 which rotates continuously in the direction of the arrow $f$. The tape 2 to be driven passes over the capstan 1. Opposite the capstan 1 and on the opposite side of the tape 2 is an idler roller 3 carried on a lever arm 4 pivotable about a fixed axis 5 parallel to the axes of the idler roller 3 and capstan 1.

An electromagnet 6 with winding 7 connected between terminals 7', 7'' is selectively operable to pivot the lever arm 4, which is made of a magnetic material, about the axis 5, so as to urge the idler roller 3 towards the capstan 1. This produces a tape driving pinch. The lever arm 4 is so arranged that when the electromagnet 6 is not operated, the idler roller 3 contacts the tape 2 with substantially negligible pressure.

The end 4'' of the arm 4 is embedded in an elastomer mass 20, for example silastene. One end of a bar 21, terminating in a disc-shaped portion 22, is embedded in the elastomer mass 20. The other end of the bar 21 is attached to a slider 23 having a hollow portion 25 slidable on a rod 26 which is attached to the base structure 30. The rod 26 has a screw-threaded portion and carries a regulating nut 27 and a locking nut 28. The regulating nut 27 is coupled to the slider 23 by a coil spring 24.

The slide surface of the rod 21 is in contact with an abutment 32 mounted on a base 31 which is attached to a base structure 30. A pusher 33 opposite the abutment 32 urges the rod towards the abutment 32. The pusher 33 is attached to a slider 35 slidable on a rod 40. The rod 40 extends into a threaded portion 36 which is attached to the base 30 and carries a regulating nut 37 and a locking nut 38. The regulating nut 37 is connected to the slider 35 by a coil spring 40. The pusher 33 receives a force from the coil spring which may be regulated by adjusting the position of the nut 37 on the screw-threaded portion 26.

The rod 21 receives a force, owing to the action of the coil spring 24, in the direction of the arrow 43. This force is arranged, by adjusting the position of the nut 27, to be just sufficient to hold the idler roller in contact with the tape while exerting a substantially negligible pressure on it.

The cross-section of the pusher 33 and the abutment 32 is less than the diameter of the rod 21. The rod 21 is of a material less hard, for example bronze, than the pusher 33 and abutment 32 which are, for example, of steel. In this way, the friction will produce a uniform wear of the surfaces of the pusher 33 and abutment 32 in contact with the rod 21. If the cross-section of the parts 33 and 32 was greater than the diameter of the bar 21, an indentation would be produced in the parts 32 and 33 having a cross-section equal to the width of the rod. Owing to the fact that the displacement of the rod does not take place in a straight line, the rod 21 would eventually be restricted in movement by these indentations. The rod 21 and disc 22 may be produced by molding.

The device as described has the advantages that it is easy to construct and the pusher 33 is held in contact with the rod 21 by the spring 34 even in the case of large temperature variations. The spring 34 may be adjusted by the nut 37.

In practice the axis of the rod 40, slider 35 and abutment 32 lies in a plane perpendicular to the plane of the FIGURE.

What is claimed is:

1. A capstan drive arrangement suitable for a high speed intermittent tape drive, including a motor driven capstan, an idler roller carried on a lever arm, an electromagnet means for selectively pivoting said lever arm about its axis to urge the idler roller towards the capstan to produce a tape driving pinch, positioning means for positioning said lever arm when the electromagnet is not operated so that the idler roller contacts the tape with substantially negligible pressure including a support rod having a side surface held in contact with a fixed abutment by a pusher and a damping element providing elastically deformable connection between the lever arm and said support rod.

2. An arrangement as claimed in claim 1 wherein one end of said support rod is connected to a slider slidable on a second rod, the slider and second rod being coupled together by a spring.

3. An arrangement as claimed in claim 2 wherein said damping element providing the elastically deformable connection comprises a mass of elastomer material molded onto the rod and lever arm.

4. An arrangement as claimed in claim 3 wherein the rod terminates in an enlarged portion embedded in the mass.

5. An arrangement as claimed in claim 4 wherein the enlarged portion is a disc.

6. An arrangement as claimed in claim 5 wherein the pusher is urged towards the rod by a coil spring.

7. An arrangement as claimed in claim 6 wherein the coil spring has one end attached to the pusher and the second end attached to a nut threaded on a screw-threaded portion of a fixed third rod, so that the position of the second end of the coil spring may be adjusted relative to the position of the third rod.

8. An arrangement as claimed in claim 7 wherein the third rod terminates in a cylindrical cavity in the pusher.

9. An arrangement as claimed in claim 8, wherein the coil spring which connects the slider and second rod is attached at one end to the slider and at its other end to a nut threaded on the second rod which is fixed at one end.

10. An arrangement as claimed in claim 9 wherein the abutment and pusher have a cross-section smaller than the diameter of the rod.

11. An arrangement as claimed in claim 10 wherein the abutment and pusher are made of a mechanically harder material than the rod.

12. An arrangement according to claim 11 wherein the abutment and pusher are made of steel and the rod is made of bronze.

13. An arrangement as claimed in claim 12 wherein the rod is a flat rod.

14. An arrangement as claimed in claim 2 wherein the coil spring which connects the slider and second rod is attached at one end to the slider and at its other end to a nut threaded on the second rod which is fixed at one end.

15. An arrangement as claimed in claim 1 wherein said damping element providing the elastically deformable connection comprises a mass of elastomer material molded onto the rod and lever arm.

16. An arrangement as claimed in claim 1 wherein the pusher is urged towards the rod by a coil spring.

17. An arrangement as claimed in claim 1 wherein the abutment and pusher have a cross-section smaller than the diameter of the rod.

18. An arrangement as claimed in claim 1 wherein the abutment and pusher are made of a mechanically harder material than the rod.

19. An arrangement according to claim 1 wherein the abutment and pusher are made of steel and the rod is made of bronze.

20. An arrangement as claimed in claim 1 wherein the rod is a flat rod.

* * * * *